United States Patent [19]
Fenton et al.

[11] Patent Number: 5,101,416
[45] Date of Patent: Mar. 31, 1992

[54] MULTI-CHANNEL DIGITAL RECEIVER FOR GLOBAL POSITIONING SYSTEM

[75] Inventors: Patrick Fenton; Kwok-Ki K. Ng; Thomas J. Ford, all of Calgary, Canada

[73] Assignee: NovAtel Comunications Ltd., Calgary, Canada

[21] Appl. No.: 619,316

[22] Filed: Nov. 28, 1990

[51] Int. Cl.⁵ .......................................... H04B 15/00
[52] U.S. Cl. ........................................ 375/1; 342/357
[58] Field of Search ............................. 375/1; 342/357

[56] References Cited

U.S. PATENT DOCUMENTS

| | | |
|---|---|---|
| 4,426,712 | 1/1984 | Gorski-Popiel . |
| 4,457,006 | 6/1984 | Maine . |
| 4,530,103 | 7/1985 | Mosley, Jr. et al. . |
| 4,611,333 | 9/1986 | McCallister et al. . |
| 4,754,465 | 6/1988 | Trimble . |
| 4,785,463 | 11/1988 | Janc et al. . |
| 4,791,378 | 12/1988 | Waltham . |
| 4,800,577 | 1/1989 | Tachita et al. . |
| 4,807,256 | 2/1989 | Holmes et al. . |
| 4,821,294 | 4/1989 | Thomas, Jr. . |
| 4,847,862 | 7/1989 | Braisted et al. ........................ 375/1 |
| 4,894,842 | 1/1990 | Broekhoven et al. . |
| 5,016,257 | 5/1991 | Wolf et al. ........................ 375/1 |

FOREIGN PATENT DOCUMENTS

| | | |
|---|---|---|
| 0312193 | 7/1988 | European Pat. Off. . |
| 0351156 | 7/1989 | European Pat. Off. . |
| 2215539 | 3/1988 | United Kingdom . |

OTHER PUBLICATIONS

Langley, R. B., "Why is the GPS So Complex?", *GPS World*, May/Jun. 1990, pp. 56-59.

*Primary Examiner*—Thomas H. Tarcza
*Assistant Examiner*—David Cain
*Attorney, Agent, or Firm*—Cesari & McKenna

[57] ABSTRACT

A receiver for pseudorandom noise (PRN) encoded signals consisting of a sampling circuit and multiple channel circuits, with each channel circuit including a carrier and code synchronizing circuit and multiple digital correlators with dynamically adjustable code delay spacing. The sampling circuit provides high-rate digital samples of the incoming composite signal to each receiver channel. Within each channel, the synchronizing circuit detects cycle slips in a locally generated carrier reference signal as well as phase drift in a locally generated PRN code signal. The correlators compare the digital samples with a locally generated PRN code to produce early, late, and/or punctual correlation signals which are used to adjust the local PRN code. A non-linear sampling technique may be used to provide increased sensitivity in the presence of continuous wave interfering signals.

9 Claims, 7 Drawing Sheets

MULTI-CHANNEL DIGITAL RECEIVER FOR GLOBAL POSITIONING SYSTEM

FIELD OF THE INVENTION

This invention relates generally to digital radios which receive pseudorandom noise (PRN) encoded signals such as those used in navigation systems.

BACKGROUND OF THE INVENTION

Passive pseudorandom noise (PRN) ranging systems such as the United States' Global Positioning System (GPS) and the Union of Socialist Republics' Global Navigation System (GLONASS) allow precise determination of latitude, longitude, elevation and time. A PRN ranging system receiver accomplishes this by using time difference of arrival and Doppler measurement techniques on precisely-timed signals transmitted by orbiting satellites. Because only the satellites transmit, the need for two-way communications is avoided, and an infinite number of receivers may be served simultaneously.

However, the transmitted signal must contain a number of components in order for the receivers to extract the requisite information; Thus each satellite transmits on at least one carrier frequencies. Each carrier is modulated with low frequency (typically 50 Hz) digital data which consists of information such as the satellite's ephemeris, (i.e. position), current time of day, and system status information. The carrier is further modulated with one or more high frequency unique pseudorandom noise (PRN) codes.

A PRN receiver thus receives a composite signal consisting of one or more of the signals transmitted by the satellites within view, that is within a direct line-of-sight, as well as noise and any interfering signals. Because the signals transmitted by different satellites use unique PRN codes or unique frequencies, the receiver may separate the signals from different satellites using code-division multiple access (CDMA) or frequency division multiple access (FDMA) techniques. The PRN codes also provide a mechanism to precisely determine the signal transmission time from each satellite. By determining the transmission time from at least four satellites, and knowing each satellite's ephemeris and approximate time of day information, the receiver's three dimensional position, velocity and precise time of day can be calculated.

For more information on the format of the GPS CDMA system signals, see "Interface Control Document ICD-GPS-200, Sept. 26, 1984", published by Rockwell International Corporation, Satellite Systems Division, Downey, Calif. 90241.

For more information on the format of the GLONASS system signals, see "The GLONASS System Technical Characteristics and Performance", Working Paper, Special Committee on Future Air Navigation Systems (FANS), International Civil Aviation Organization (ICAO), Fourth Meeting, Montreal, Quebec, Canada, May 2-20, 1988.

A number of difficulties exist with present-day PRN receivers. One such problem concerns accurate tracking of the received composite signal. Another is determining and correcting carrier phase lock loop cycle slipping. Another is determining and correcting ionospheric divergence. The typical PRN receiver includes a downconverter and a mixer. At the downconverter, the input radio frequency (RF) signal from the antenna is amplified, filtered, and downconverted to an IF frequency by mixing it with a locally generated carrier reference signal. The decoder, typically consisting of a mixer positioned either before or after the downconverter multiplies the incoming signal with a locally generated PRN code reference signal. If the locally generated PRN code is properly correlated with that of the incoming signal, the digital data results.

In either implementation, however, the circuits required to perform the frequency and phase discrimination necessary to accurately generate the local carrier and PRN code reference signals are complex and costly, mainly because the composite signal ideally has a power level of 16 decibels (dB) below thermal noise. These circuits may also introduce errors due to component mismatches when the signals from several satellites are processed to calculate the receiver's position.

In addition, given the low level of received composite signal, CDMA receivers are typically quite susceptible to corruption by interfering continuous wave (CW) signals.

For high accuracy applications, atmospheric distortion of the transmitted signals must also be corrected. The principal source of such distortion is the ionosphere, which manifests itself as a delay of the PRN code phase and advance of the carrier phase. Since the amount of ionospheric distortion is a function of the carrier frequency and the total electron count along the path of the signal, the discrepancy in delay between two signals transmitted at different carrier frequencies from a single satellite may be used to determine an absolute correction factor. However, this absolute divergence correction requires twice the hardware to demodulate and decode both frequencies simultaneously. Furthermore, in some systems, such as GPS, access to the PRN code on the second frequency is limited. In certain systems, a relative divergence between the two frequencies can be determined by tracking the phase difference in carrier frequencies, without first decoding the second carrier, by simply squaring the received carrier signal. However, either approach requires radio frequency (RF) circuitry which at least partially processes two RF signals.

SUMMARY OF THE INVENTION

Briefly, the invention is a receiver for pseudorandom noise (PRN) encoded signals consisting of a sampling circuit, a carrier/code synchronizing circuit, and a digital correlator with dynamically adjustable code delay spacing and selectable delay modes.

The sampling circuit provides digital samples of a received composite PRN signal at a rate which is much higher than twice the PRN code chip rate. A receiver channel is assigned to track the PRN signal from a particular transmitter; each receiver channel includes a synchronizing circuit and two digital correlators Each synchronizing circuit is a numerically controlled oscillator which provides a local carrier reference signal and a local code reference signal which are synchronous with each other. Together with the correlator outputs, the synchronizing circuit also enables detection and correction of cycle slips in the local carrier reference and detection of relative code and carrier divergence.

The correlators correlate the digital samples of the composite signal with the locally generated PRN code values to produce a plurality of early, late, punctual, or early-minus-late correlation signals. The correlation signals are accumulated and procesed to provide feedback signals to control code and carrier synchronizing. Because both carrier and code synchronizing are performed by the same circuit, a relative diversion-type correction for ionospheric distortion may be implemented by simultaneously detecting any code or carrier divergence.

The sampling circuit output may also be fed to an amplitude probability density function circuit which detects the presence of interfering or jamming signals. When jamming signals are detected, the sampling circuit amplitude thresholds are adjusted to provide improved operation. The probability density function circuit is also used to control an automatic gain control amplifier.

The correlators may also be switched between a first, or acquisition mode, and a second, or tracking mode. In the acquisition mode, the correlators are set to give an early and late correlation power indication.

Once the proper carrier and phase are obtained, one of the correlators is configured as puntual for optimal carrier tracking, and the other correlator as early minus late with a narrow time delay to provide optimum code tracking.

Certain functions of the synchronizing circuit and correlators are preferably performed by a general purpose computer and suitable software.

There are several advantages to this arrangement. Because the system is nearly completely digital, and because a common digital signal is fed to all receiver channels, the invention reduces channel biasing errors and thus increases position measurement accuracy. Furthermore, because only a single common RF stage is required, the invention eliminates a number of difficulties such as component matching associated with other types of systems.

Because the samples are processed at a high rate, large Doppler offsets may be corrected. This in turn enables a less expensive analog local oscillator circuit to be used.

By synchronously controlling the local PRN code generator and carrier phase lock circuit in a single numerically controlled oscillator, pseudorange measurements having high accuracy and low-noise result.

Since there is accurate tracking of the PRN code, cycle slips of the carrier can be easily detected and corrected, and real time differential measurements are significantly better.

Divergence between locally generated carrier and code reference signals can be detected and thus a relative diversion correction for ionospheric distortion is provided.

The probability density function detector enables improved performance in the presence of jamming signals.

The dynamically configurable correlators provide fast code and carrier acquisition while providing low noise signals during steady-state tracking.

BRIEF DESCRIPTION OF THE DRAWINGS·

The above and further advantages of the invention may be better understood by referring to the following description in conjunction with the accompanying drawings, in which.

DETAILED DESCRIPTION OF ILLUSTRATIVE EMBODIMENTS

Figure 1:
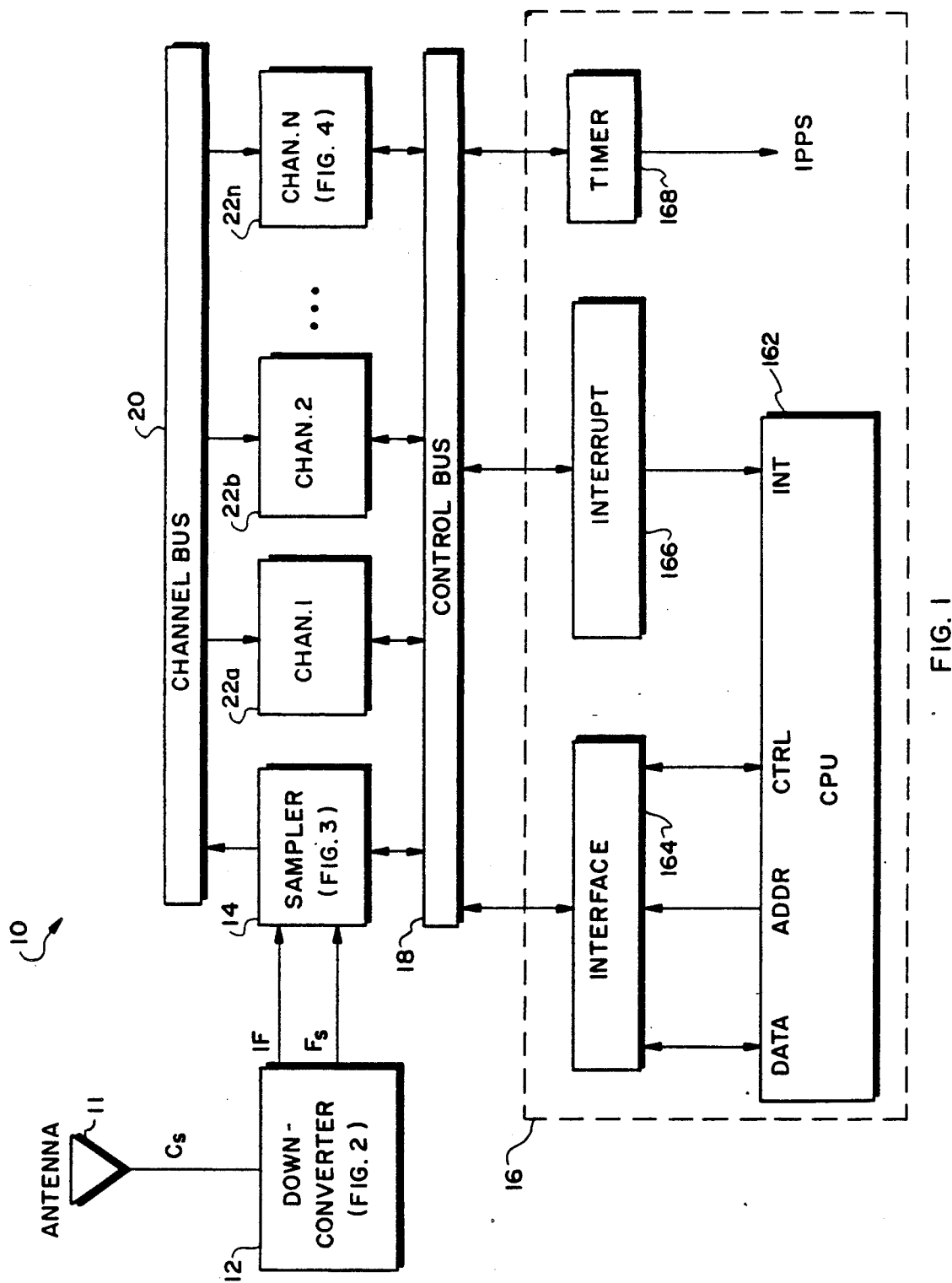
FIG. 1 is a block diagram of a PRN receiver constructed in accordance with the invention, including a downconverter, sampler, channel, and processor circuits.

FIG. 1 is an overall block diagram of a pseudorandom noise (PRN) ranging receiver 10 constructed in accordance with the invention. It includes an antenna 11, downconverter 12, sampler 14, processor 16, control bus 18, channel bus 20 and multiple channels 22a, 22b, 22 n, (collectively, the channels 22). The illustrated receiver 10 will be primarily described as operating within the United States' Global Positioning System (GPS), however, adaptations to the Union of Soviet Socialist Republics' GLONASS are also described.

The antenna 11 receives a composite signal $C_S$ consisting of the signals transmitted from all participating satellites within view, that is, within a direct line of sight of the antenna 11. For example, when the GPS system is fully operational, with world-wide coverage, twenty-four satellites will be in operation, and signals from as many as eleven GPS satellites may be received simultaneously.

The composite signal $C_S$ is forwarded to the downconverter 12 to provide an intermediate frequency signal IF and a sample clock signal $F_S$. The IF signal is a downconverted and filtered version of the composite signal $C_S$. The $F_S$ signal indicates the points in time at which samples of the IF signal are to be taken. The downconverter 12 is discussed in greater detail in connection with FIG. 2.

The sampler 14 receives the IF and $F_S$ signals and provides digital samples of the IF signal to the channels 22 via the channel bus 20. The samples consist of in-phase ($I_S$) and quadrature ($Q_S$) amplitude samples of the IF signal taken at the times indicated by the $F_S$ signal. The sampler is detailed in FIG. 3.

Each channel 22 is assigned to process the signal transmitted by one of the satellites presently within view of the antenna 11. A given channel 22 thus processes the $I_S$ and $Q_S$ signals and tracks the carrier and code of the signal transmitted by a particular satellite. In particular, each channel 22 uses a carrier/code synchronizing circuit to frequency and phase-track the PRN encoded carrier signal by maintaining an expected doppler offset unique to the desired satellite. The channel 22 also correlates a locally generated PRN code reference signal with a doppler-rotated replica of the carrier. Two correlators, connected in a delay lock arrangement, keep the locally generated PRN code precisely aligned with the code modulated onto the received signal by the satellite. The resulting decoded data, including the satellite's ephemeris, time of day, and status information, as well as the locally generated PRN code phase and carrier phase measurements, are provided to the processor 16 via the control bus 18. The channels 22 are described in detail in connection with FIG. 4.

The sampler 14 and channels 22 are controlled by the processor 16 via the control bus 18. The processor 16 includes a digital central processing unit (CPU) 162 which typically supports both synchronous-type input-/output (I/O) via a multiple-bit data bus DATA, address bus ADDR, and control signals CTRL and synchronous controller circuit 164, as well as an interrupt-type I/O via the interrupt signals, INT and an interrupt controller circuit 166. A timer 168 provides certain timing signals such as the measurement triggers MEAS and a time-stamp signal IPPS, as will be described. The operation of the processor 16 and its various functions implemented in software will be better understood from the following discussion.

Figure 2:
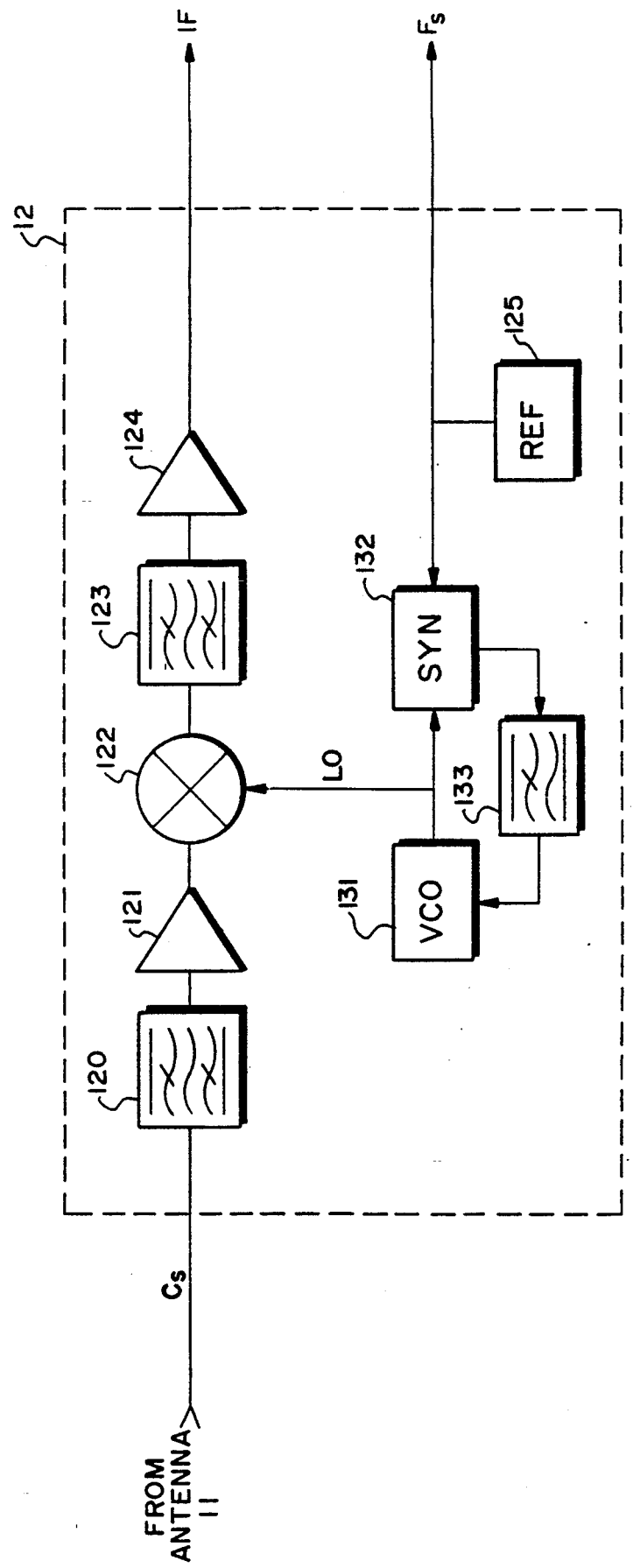
FIG. 2 is a circuit diagram of the downconverter circuit.

Referring now to FIG. 2, the downconverter 12 includes an RF bandpass filter 120, low noise amplifier 121, mixer 122, intermediate-frequency filter 123, and final amplifier 124. A local reference oscillator 125 provides a samples clock signal, $F_S$. A voltage controlled oscillator (VCO) 131 is phase locked to the reference oscillator 125 by using a synthesizer 132 and filter 133 arranged in a feedback loop. The VCO 131 provides a local oscillator reference signal, LO, to the mixer 122.

The composite signal $C_S$ received from the antenna 11 typically consists of PRN modulated signals from all satellites within view (that is, within a direct line-of-sight of the receiver 10), any interfering signals, and noise. Of interest are the PRN modulated L-band carrier frequencies, some typical L-band signals used by various ranging systems are as follows:

| SPECIFICATIONS FOR CERTAIN PRN RANGING SYSTEM SIGNALS | | | |
|---|---|---|---|
| L-Band Carrier | Frequency | PRN Code Rate | Power |
| GPS L1 C/A | 1.57542 GHz | 1.023 MHz | −160 dBW |
| GPS L1 P | 1.57542 GHz | 10.23 MHz | −163 dBW |
| GPS L2 | 1.22760 GHz | 10.23 MHz | −166 dBW |
| GLONASS C/A | 1.602 ... 1.616 GHz | 511 KHz | |
| GLONASS P | 1.602 ... 1.616 GHz | 5.11 MHz | |

Natural background noise at about −204 dBW/Hz is typically mixed in with the L-band signals as well.

The $C_S$ signal is first fed to the RF bandpass filter 120 which is a low insertion-loss filter having a bandpass at the desired carrier frequency. The bandpass filter 120 should be sufficiently wide to allow several harmonics of the PRN code to pass. In the preferred embodiment for GPS L1 C/A signal reception, this bandwidth is at least 10 MHz. After passing through the low-noise preamplifier 121, the mixer 122 downconverts the received signal from the carrier frequency to a desired intermediate frequency that is within the frequency range of the sampler 14. The intermediate frequency filter 123 is also a bandpass filter having a sufficiently narrow bandwidth to remove any undesired signals, but sufficiently wide to keep the desired 20 MHz bandwidth. The final amplifier 124 is used as a pre-amplification stage to provide the output IF signal with appropriate amplification. Although the illustrated downconverter 12 is a single-stage downconverter, there could, of course, be additional intermediate stages used.

The reference oscillator 125 provides a stable digital frequency local reference signal $F_S$ to the synthesizer 132 as well as the sampler 14. The VCO 131 provides the reference signal LO to the synthesizer 132. The synthesizer 132 frequency-divides the LO signal by a predetermined number and mixes it with the reference signal $F_S$. The output of the synthesizer 132 is then fed to the loop filter 133 to develop a voltage which in turn controls the VCO 131.

Figure 3:
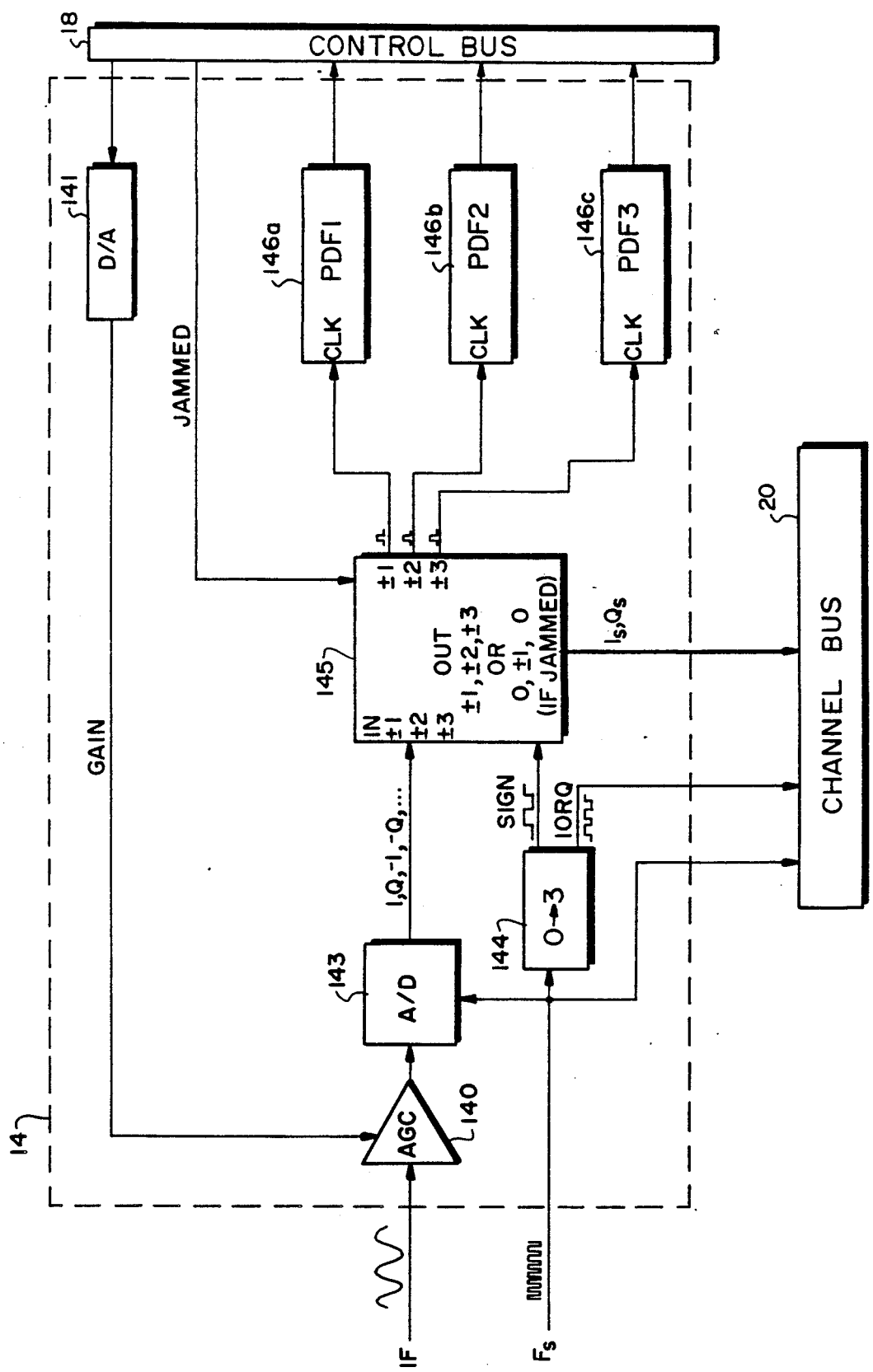
FIG. 3 is a circuit diagram of the sampler circuit.

FIG. 3 is a detailed diagram of the sampler 14, including an automatic gain control (AGC) amplifier 140, digital-to-analog (D/A) converter 141, A/D converter 143, two-bit counter 144, sample translator 145, and probability density function (PDF) counters 146a, 146b, and 146c (collectively, the PDF counters 146).

The sampler 14 receives the IF and the $F_S$ signals from the downconverter 12 and provides digital sampled signals $I_S$ and $Q_S$ to the channels 22 via the channel bus 20. The sampler 14, together with the processor 16 via the control bus 18, also performs automatic gain control (AGC) and jamming suppression functions.

More particularly, the intermediate frequency signal IF is first fed to the AGC amp 140 which provides an amount of amplification set by the processor 16 via the control bus 18 and D/A 141. The output signal from the AGC amp 140 is sent to the analog-to-digital-converter 143.

The A/D converter 143 samples at precisely 90° phase rotations of the IF signal's carrier frequency, as specified by the $F_S$ signal. Since successive in-phase samples $I_S$ and quadrature samples $Q_S$ are required, the frequency of the digital sample clock $F_S$ must be equal to 4 IF/J, where J is any odd integer. The Nyquist sampling theorem also dictates that the sample rate be at least twice the bandwidth of the IF signal. With the digital sample clock $F_S$ chosen according to these guidelines, the output samples from the A/D 143 are thus in in-phase and quadrature order as i,q, −i, −q, i,q ...

The $F_S$ signal also drives a two-bit counter 144 which is used by the sample translator 145 to separate the samples output by the A/D 143 into the sample signals $I_S$ and $Q_S$. The most significant bit, SIGN, of the counter 144 is used by the sample translator 145 to reverse the sign on the −i and −q samples. The least significant bit of the counter 144 represents the IORQ signal that is used by the channels 22 to identify individual samples on the $I_S$, $Q_S$ bus as either an i or a q sample.

If the A/D converter 143 is a three-bit device, the output samples have two magnitude bits and a sign bit. Each sample will thus be either a +/−1, +/−2, or −3.

The sample signals $I_S$ and $Q_S$, along with the IORQ and $F_S$ signals, are routed to the sample bus 20 to be processed by the channels 22.

The samples output from the A/D converter 143 are also used to develop an estimate of the probability density function for the amplitude of the incoming IF signal. This estimate is used by the processor 16 to provide a gain control signal GAIN, which is fed through the D/A converter 141 to control the gain of the AGC amp 140. The probability density function estimate is obtained by clocking one of the appropriate PDF counters 146a, 146b, or 146c according to the absolute value of each sample. For example, magnitude +2 and magnitude −2 samples cause the PDF2 counter 146b to be incremented. The PDF1 counter 146a and PDF3 counter 146c are similarly clocked each time a sample with the corresponding magnitude is received. When any one of the PDF counters 146 reaches a terminal count, a CARRY signal is asserted and the DISABLE inputs are set so that all PDF counters 146 stop counting. The contents of the PDF counters 146 can be read and reset by the processor 16 via the control bus 18.

To set the AGC level, the processor 16 periodically reads the values of the PDF counters 146 and then resets them so that another PDF measurement may begin. The processor 16 then compares the measured signal amplitude distribution data with the expected distribution of the sample amplitudes. Since the expected probability density function is Gaussian, 49% of the samples are expected in PDF1 counter 146a, 32% in PDF2 counter 146b, and 19% of the samples in PDF3 counter 146c. If this is indeed the approximate result, then the AGC 140 is properly set. However, if too many samples are counted by the PDF1 counter 146a, for example, then the GAIN signal is set too low. Similarly, if too many samples are counted by the PDF2 counter 146c, the GAIN signal is set too high. The processor 16, if necessary, then loads a corrected gain control value into the D/A 141 via the control bus 18, which in turn adjusts the gain of the AGC 140. This process continues periodically to maintain the GAIN level such that the PDF1 count remains at 49%.

The processor also checks PDF counters 146b and 146c to determine if they are close to the expected 32% and 19%. If there is a continuous-wave (CW) interference present, the PDF3 counter 146c will drop towards 0% and the PDF2 counter 146b will increase towards 51%, depending on the level of the interfering signal.

If the processor 16 detects this condition, it enters a CW anti-jamming mode. In a CW anti-jamming mode, the processor 16 adjusts the D/A 141 such that the count in PDF1 146a is maintained at 85%. It also expects to detect 15% of the samples in the PDF2 counter 146b, and no samples in the PDF3 counter 146c. In this mode, the processor 16 also enables the JAMMED control line so that the translator 145 will rescale the samples output by the A/D 143. In particular, samples of amplitude $+/-1, +/-2, +/-3$ are mapped into amplitudes $0, +/-1, 0$, respectively. The AGC 140 is also set so that the peak positive and negative voltages of the CW signal correspond to the $+1/+2$ and $-1/-2$ threshold levels of the A/D 143, so that the thresholding logic of the A/D 143 directly demodulates the desired signal and rejects the jamming signal. With anti-jamming mode enabled, an approximate improvement of 12 dB has been observed over purely analog receives, and 25 dB improvement over 1 bit hard-limited digital receives.

A truth table for the translator 145 is given by the following:

satellite from the $I_S$ and $Q_S$ samples of the composite signal by correlating them with a locally generated replica of the appropriate PRN code. It also rotates the $I_S$ and $Q_S$ samples to remove any Doppler frequency offset caused by satellite motion, receiver motion, and reference oscillator errors.

Briefly, the synchronizer 220 is a single numerically controlled oscillator (NCO) which uses the sample clock $F_S$ and appropriate instructions from the processor 16 to provide the control signals required by PRN code generator 230 and correlators 240 to track the frequency and phase of the carrier, including any residual Doppler, as well as to track the PRN code.

The code generator 230 uses signal pulses output by the synchronizer 220 to generate a local PRN reference signal, PRN CODE, corresponding to the PRN code associated with the satellite assigned to channel 22n. PRN code generators such as code generator 230 are well known in the art. The PRN CODE signal is also forwarded to the delay line flip-flops 250a and 251b which provide the PRN CODE signal with selected delays via through the XOR gate 255 and switch 256 to the correlators 240.

The correlators 240 also receive the $I_S$, $Q_S$, IORQ, and $F_S$ signals from the channel bus 20. They may be configured in two modes. In the first mode, correlator B 240b is configured as an early correlator and correlator A 240a is configured as a late correlator. This first mode is used for initial PRN code synchronization. In a second mode, correlator B 240b is configured as "early minus late" and correlator A 240a as punctual. This second mode is used for carrier and PRN code tracking. The switch 256 is used to select between the first and second modes of operation. Both correlators 240 correlate, rotate, and accumulate the $I_S$ and $Q_S$ samples, and then provide accumulated sample outputs $I_A$, $Q_A$ and $I_B$, $Q_B$ to the processor 16.

Figure 5:
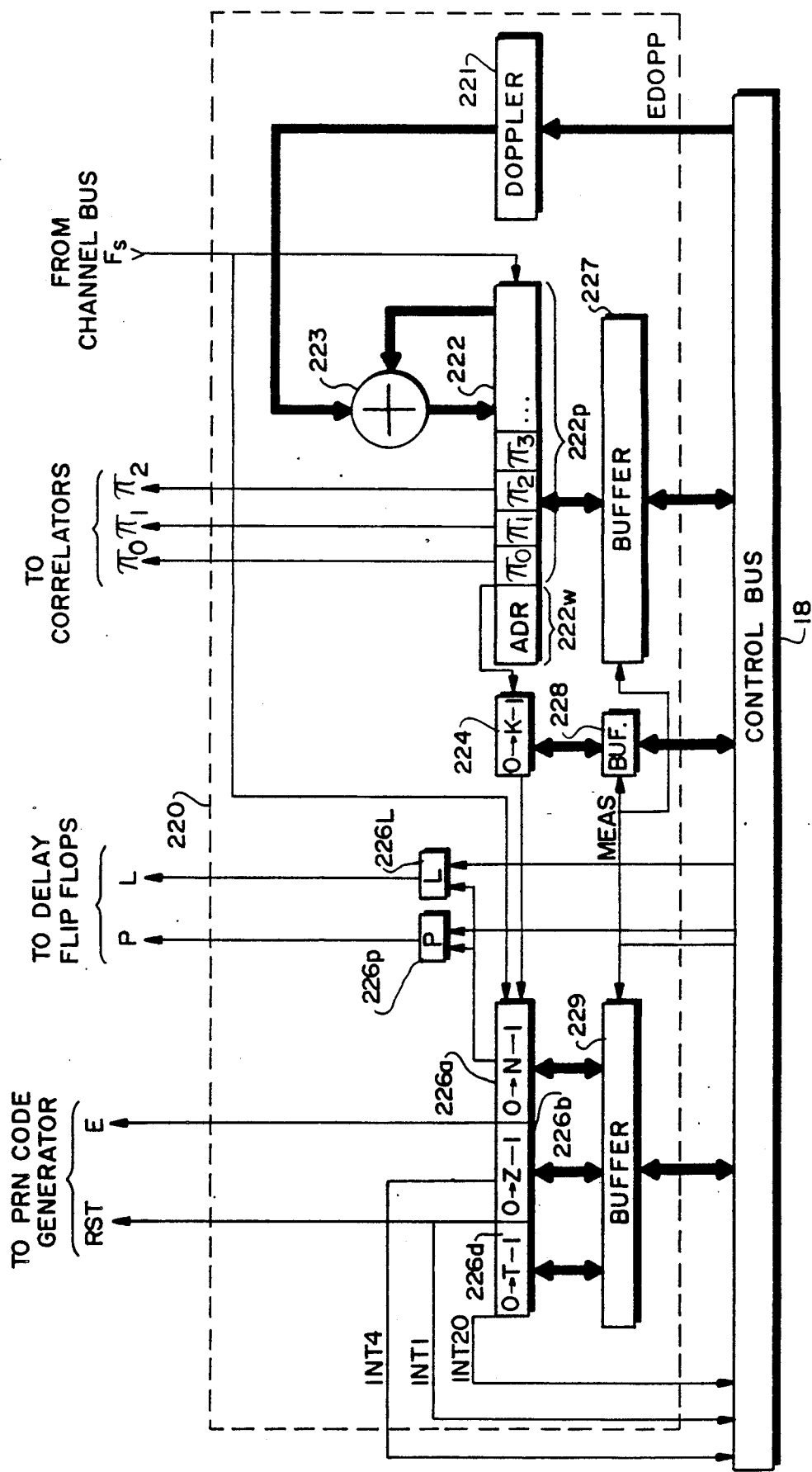
FIG. 5 is a circuit diagram of a carrier/code synchronizing circuit used in each channel circuit.

FIG. 5 shows a detailed block diagram of the carrier/code synchronizer 220 including an expected Doppler rate register 221, an accumulated delta range (ADR) register 222, and a fine chip counter 224. A code phase generator circuit 226 includes a subchip counter 226a, chip counter 226b, epoch counter 226d, and P-comparator 226p and L-comparator 226L. Buffers 227, 228, and 229 allow the processor 16 to load, read, and add to or subtract from the contents of the various counters and registers.

Briefly, the synchronizer 220 accepts the sample clock signal $F_S$ from the channel bus 20, an expected Doppler value EDOPP and corrected values for the

|  | $I_S$ or $Q_S$ (Per IORQ) | | | | |
|---|---|---|---|---|---|
| Input from A/D | SIGN = 0 JAMMED = 0 | SIGN = 1 JAMMED = 1 | SIGN = 0 JAMMED = 0 | SIGN = 1 JAMMED = 1 | PDM Counter Incremented |
| 3 | 3 | −3 | 0 | 0 | pdf3 |
| 2 | 2 | −2 | 1 | −1 | pdf2 |
| 1 | 1 | −1 | 0 | 0 | pdf1 |
| −1 | −1 | 1 | 0 | 0 | pdf1 |
| −2 | −2 | 2 | −1 | 1 | pdf2 |
| −3 | −3 | 3 | 0 | 0 | pdf3 |

Figure 4:
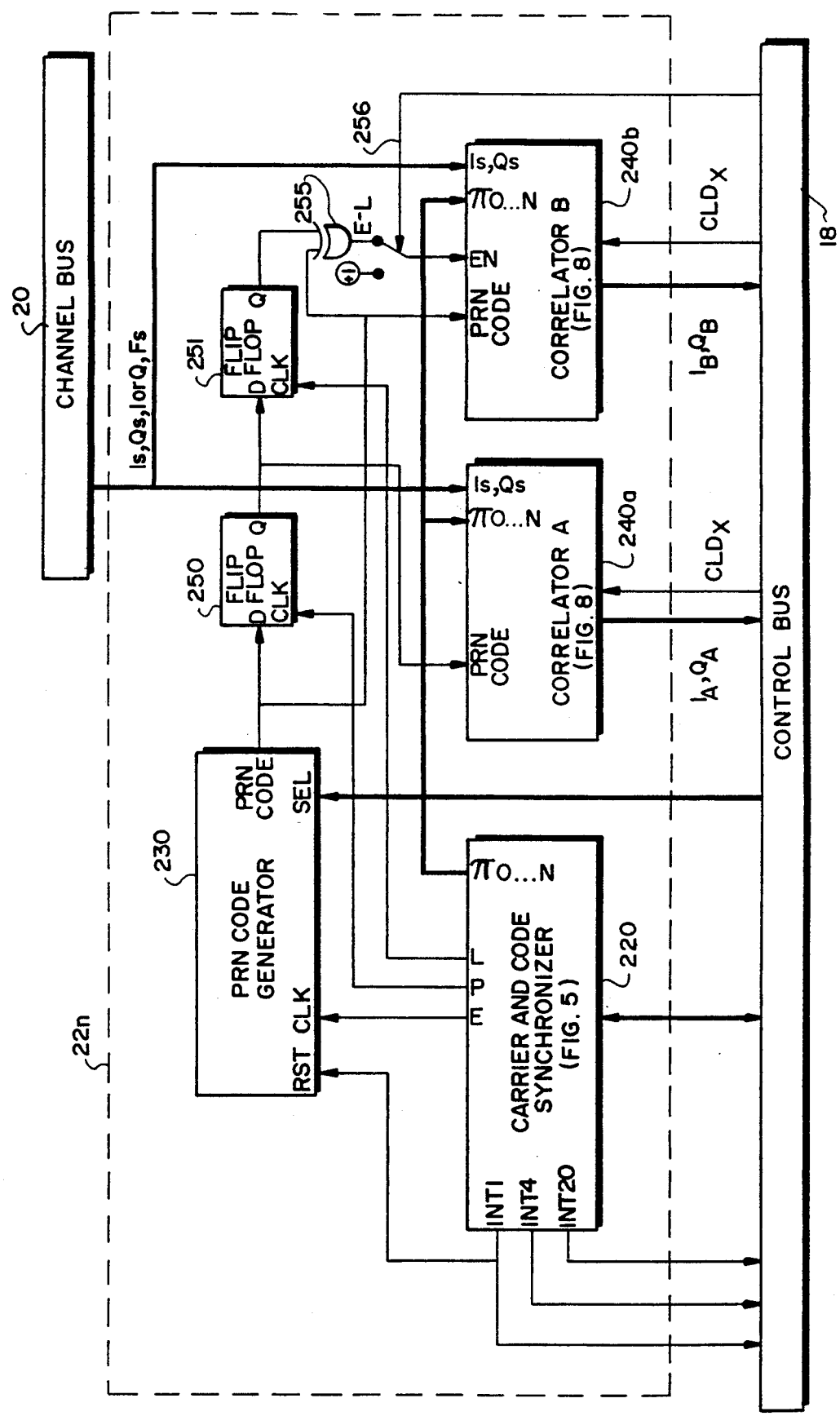
FIG. 4 is a block diagram of the channel circuit.

Turning now to FIG. 4, a typical channel 22n is shown. The channel 22n includes a carrier/code synchronizer circuit 220, PRN code generator 230, two correlators 240a and 240b (collectively, correlators 240), a delay line formed by the flip-flops 250 and 251, XOR gate 255, and switch 256. The channel 22n tracks the PRN encoded signal transmitted by a particular registers and counters 222, 224 and 226 from the control bus 18. In response to thee inputs, it provides a clock signal E and reset signal RST to the PRN code generator 230, clock signals P and L to the delay line flip-flops 250 and 251, and interrupt signals INT1, INT4, and INT20 to the control bus 18. It also provides an instantaneous carrier phase angle estimate via bits $\pi_0, \pi_1, \ldots$ $\pi_n$ to the correlators 240. In addition, the contents of the ADR register 222, subchip counter 224, and code phase generator 226 provide an instantaneous estimate of the transmit time of the particular satellite signal assigned to channel 22n. The difference between this estimate of the transmit time and the receiver time of day, as indicated by the timer 168, is the propagation time of the signal plus any receiver clock offset. By multiplying the propagation time by the speed of light, an estimate of the range from the receiver to the satellite is determined. These measurements occur at selected time indicated by the measurement strobe MEAS from the timer 168, and are typically taken simultaneously across all the channels 22. The resulting range to each satellite is then used by the processor 16 to compute the position of the receiver 10.

Figure 6:
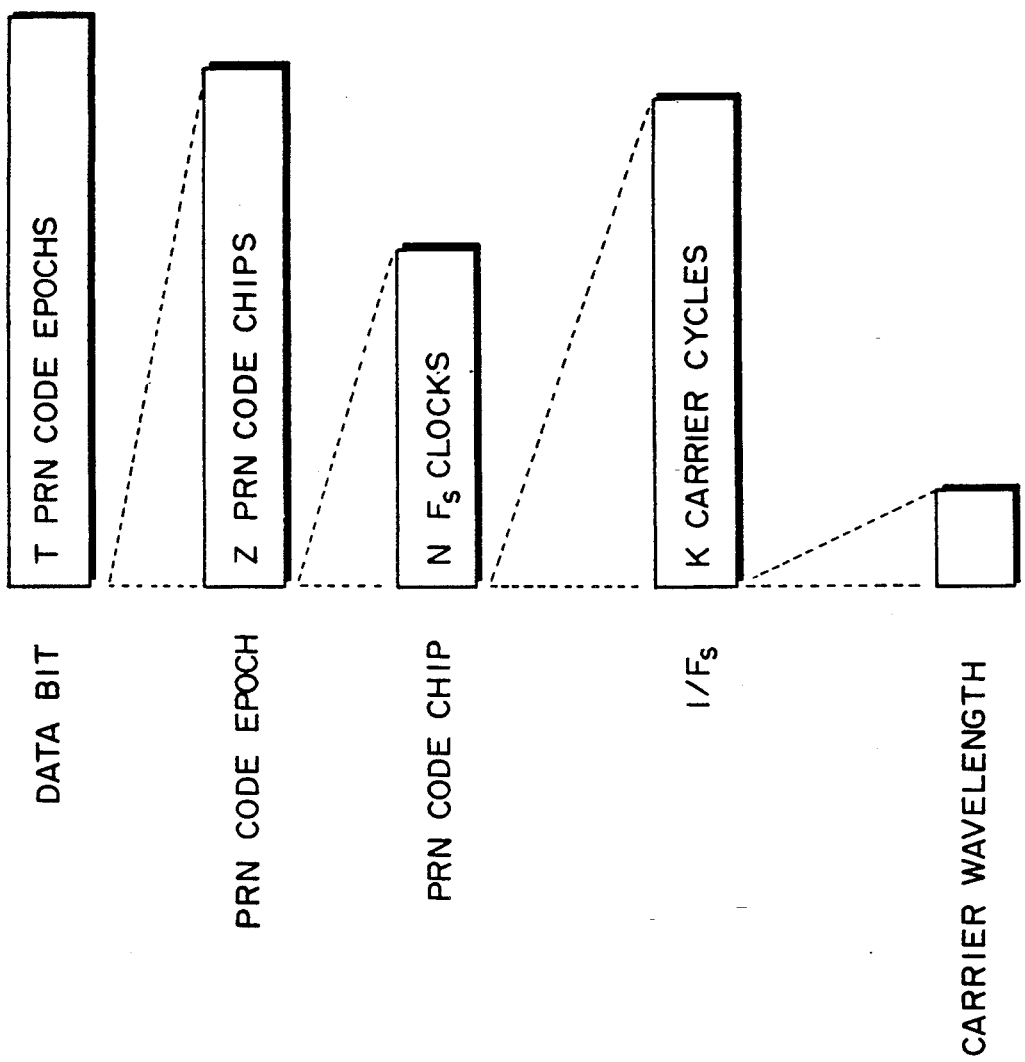
FIG. 6 is a timing diagram showing the relative duration of various portions of a received PRN signal.
Figure 7:
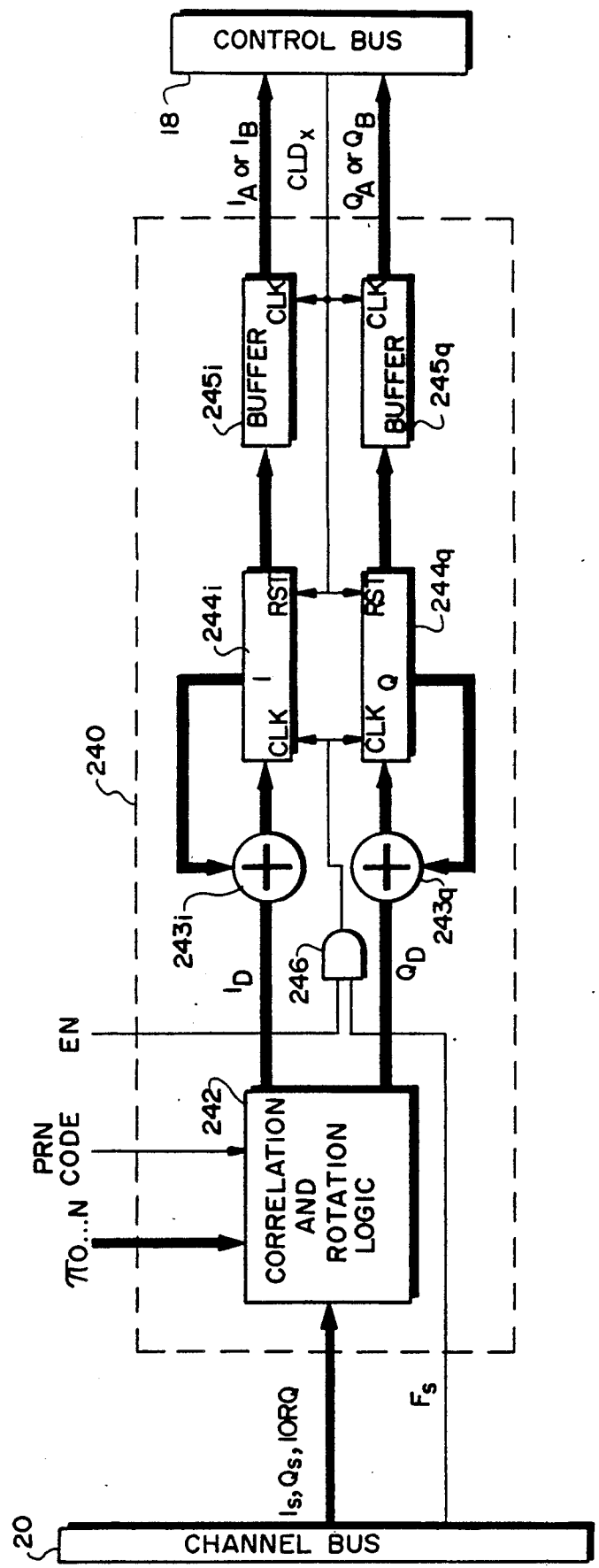
FIG. 7 is a circuit diagram of a correlator circuit used in each channel circuit.

Before beginning with a detailed discussion of the various components of the synchronizer 220, reference should be made to FIG. 6 which shows, on a distorted time scale, the relative durations of various components of a PRN ranging signal, and certain other signals in a preferred embodiment of the synchronizer 220. For example, starting at the bottom of FIG. 6, a single carrier cycle has a particular duration, C. A single cycle of the generated clock $F_S$ signal consists of K carrier cycles. A PRN code chip includes N $F_S$ cycles. A PRN code epoch consists of Z PRN code chips, where Z is also known as the sequence length of the PRN code. One data bit typically consists of T PRN code epochs. For the preferred embodiment of the invention adapted to receive the GPS L1 ranging signal, the carrier frequency is 1575.42 MHz, K is 77 so that $F_S$ equals 20.46 MHz, N is 20 so that the PRN code chip rate is 1.023 MHz, Z is 1023 so that the PRN code epoch rate is 1 kHz, and T is 20, so that the data bit rate is 50 Hz.

Now returning to FIG. 5, the synchronizer 220 will be described in greater detail. The expected Doppler rate register 221 is loaded via the processor bus 18 with an estimated Doppler EDOPP for the particular satellite tracked by channel 22n. In most instances, such as when the receiver 10 has been operating for some time, this estimate may be taken from the almanac data already received from satellites to which the receiver 10 has already been synchronized, since GPS data includes an estimated position and viewing of all other operating satellites. However, if this almanac data is not available, such as when the receiver 10 is first turned on, this estimate is determined by successive approximation techniques which will be described in greater detail shortly.

The Doppler value is specified in carrier Doppler cycles per $F_S$ pulse. For example, if the expected Doppler is +4.45 kiloHertz (kHz), which is a possible Doppler for a stationary receiver 10 and an approaching satellite, dividing by a typical $F_S$ frequency of 20.46 MHz for the GPS L1 embodiment results in an expected Doppler shift of approximately 0.00044 carrier cycles per $F_S$ pulse. Specified in this way, the Doppler value will always be less than one.

The ADR 222 is divided into a whole cycle portion 222w and a partial cycle portion 222p. As shown, an adder 223 is arranged to add the contents of the Doppler register 221 to the partial cycle portion 222p of the ADR 222 upon the occurrence of every $F_S$ pulse. The most significant bits $\pi_0, \pi_1 \ldots \pi_n$ of the partial cycle portion 222p thus give an instantaneous expected carrier phase angle in cycles.

When the partial cycle register 222p has a carry out, the whole number portion 222w is incremented and the fine chip counter is incremented. If the partial cycle register 222p requires a borrow, then the the whole number portion 222w and fine chip counter 224 are decremented.

The subchip counter 226a is clocked by the $F_S$ signal and controlled by the fine chip counter 224. Subchip counter 226a is nominally a 0 to $N-1$ counter controlled directly by the $F_S$ signal, but may be adjusted to count one extra cycle or one fewer cycle depending upon the state of the fine chip counter 224. In particular, when the fine chip counter carries out, i.e., increments from $K-1$ to 0, a cycle is stolen from the sub chip counter 226a to keep it synchronized with the ADR 222. In other words, this event causes the subchip counter 226a to count only to $N-2$ for one interation.

When the fine chip counter 224 borrows, i.e., decrements from 0 to $K-1$, a cycle is added to the subchip counter 226 so that it counts from 0 to N for one iteration.

By periodically removing or adding one cycle of the sample clock $F_S$, the locally generated PRN code (as controlled by the output signals RST and E of code phase generator 226) remains synchronized with the locally generated carrier phase (as indicated by the state of the ADR 222). With this arrangement, as long as the carrier phase indicated by the ADR 222 remains locked to the incoming carrier, the code phase generator 226 will remain locked to the incoming PRN code.

The most significant bit of the subchip counter 226a, or early clock signal E, indicates a PRN code chip edge, and is used to clock the local PRN code generator 230. In the preferred embodiment for the GPS L1 carrier, the subchip counter 226a counts from zero to nineteen since N equals twenty, i.e., there are twenty $F_S$ cycles per PRN code chip (FIG. 6).

The P-comparator 226p and L-comparator 226L are each connected to receive the contents of the subchip counter 226a. The P-comparator 226p provides a P clock signal used as a punctual indicator to the delay flip-flop 250. A pulse is output on the P signal whenever the contents of the subchip counter 226a equals the contents of a register within the P-comparator 226p. Likewise, the L-comparator 226L provides an L clock signal which gives a late indication to delay flip-flop 251. The contents of the P and L comparators may be written via the control bus 18 to adjust the relative time delay between the E and P clock signals and the P and L clock signals. As will be described shortly, the E, P, and L clock signals are used to control the correlators 240.

The chip counter 226b is used to determine the duration of a complete PRN code sequence. For the GPS embodiment, there are 1,023 C/A code chips in a PRN code epoch, and thus the chip counter 226b counts from zero to 1022. The most significant bit, INT1 indicates the end of a complete PRN code epoch; it is used to reset the local PRN code generator 230. Another clock signal, INT4, which is four times the rate of INT1 (i.e., the third most significant bit of the chip counter 226b) is also generated. Both INT1 and INT4 are used to interrupt the processor 16 to service the correlators 240 during an initial locking sequence, as will be described shortly.

Finally, the epoch counter 226d is sued to indicate the end of a data bit, after T PRN code epochs. This indication is given by the most significant bit of the epoch counter 226d, which is output as the INT20 signal.

Thus it can now be understood how the invention takes advantage of the fact that the carrier and PRN code are modulated onto the same frequency, and that any motion between the satellite and the receiver affects the code and carrier phase estimate equally. One inventive concept is to link the carrier tracking loop to the code tracking loop implicitly. The carrier tracking loop is inherently much more sensitive than the code tracking loop and able to measure small changes extremely accurately. Assuming the carrier loop is tracking properly, the fine chip counter 224 in conjunction with the subchip counter 226a, enables the channel 22n to accurately track any relative motion of the receiver 10 with respect to the satellite.

Unlike prior art receivers 10, code tracking as performed by synchronizer 220 is not required to track the dynamics of receiving and/or satellite motion clock drifts. The synchronizer need only be corrected for relatively low frequency ionospheric and locally generated errors. This enables the code loop implementation to have an extremely narrow bandwidth and the range measurements can be made which are less noise susceptible than prior implementations. Any relative motion caused by low frequency ionospheric distortion can be measured. These measurements can therefore be used to compute corrections to the calculated ranges to reduce the ionospheric effect, as is known in the art, or locally generated signal such as a carrier phase lock cycle slip signal.

Returning attention briefly to FIG. 4 the operation of the different modes of the correlators 240 will now be described in greater detail. It can be seen that the PRN CODE signal is forwarded to the first flip-flop 250, which is in turn clocked by the punctual clock signal P. Thus, the Q output of the flip-flop 250 provides a locally generated PRN code reference signal precisely aligned with the expected PRN code which was modulated onto the carrier signal by the satellite. The Q output of flip-flop 250a is forwarded to the PRN CODE input of correlator 240a as well as the input of flip-flop 251. Flip-flop 251 is clocked by the late clock signal L; in the preferred embodiment, this provides a PRN code reference signal having a time delay relative to the Q output of flip-flop flop 250.

The switch 256, controlled by the processor 16, determines the mode of correlator 240b. If the switch 256 is directly connected to the +1 input a first mode called (Early, Late) is entered in which the correlator 240b functions as an early correlator, since the PRN CODE is provided directly to the PRN CODE input of correlator 240b, in synchronism with the early clock signal E. The early clock signal E is typically arranged to have a phase ½ of a chip-time earlier than the punctual clock signal P, for code search and pull in modes.

In the (Early, Late) mode the PRN code generator 230, correlators 240b, and processor 16 form a delay lock loop. The differences in signal strength between the Early and Late correlators (as estimated by summing the I and Q channel signal level in each of the early and late correlators) is calculated by the processor 16, which in turn loads a different value into the code phase generator 226 via the buffer 229.

However, if the switch 256 is in the position shown, a second or (Punctual, Early-Late) mode is enabled in which the XOR gate 255 provides an "early minus late" clock signal E-L to enable the correlator 240b. In this mode the time delay between the E, P, and L signals is reduced to $1/F_S$ (by changing the values in the P and L registers 226), providing increased code phase measurement accuracy. This mode is used for steady state tracking.

PRN code phase lock is maintained by having the processor 16 calculate a code phase estimate $C_p = I_a \cdot I_B + Q_A \cdot Q_B$. The magnitude and sign of this estimate Cp gives an indication as to how much and in what direction to correct the phase of the code generator, via the buffers 229 and code pahe generator 226.

The Doppler frequency is maintained by either an automatic frequency control (AFC) loop technique or a phase lock loop (PLL) technique. The AFC loop approach uses a frequency error estimator $F_e = I_A(t-1) \cdot Q_A(t) - I_A(t) \cdot Q_A(t-1)$, where (t) and (t-1) indicate the present and previous sample sets respectively. $F_e$ thus provides an indication of how much to correct the doppler estimate EDOPP. The PLL technique uses a phase error estimate $P_e = Q_A \cdot \text{SIGN}(I_A)$ to control the phase. The carrier phase is controlled by making minor changes to the EDOPP value. The Fe term gives an indication of frequency error and Pe gives an indication of phase error.

The data bit values are typically demodulated by interpreting either a measured bit equal to $\text{SIGN}(I_A)$ if the receiver is carrier phase locked, or by interpreting a change bit as indicated by $I_A(t-1) \cdot I_A(t) + Q_A(t) \cdot Q_A(t-1)$ if the receiver is only carrier-frequency locked and not yet carrier-phase locked.

Turning attention now to FIG. 8, the operation of a typical correlator 240a will be described in greater detail. Correlator 240 consists of decoding and rotation logic 242, a pair of adders 243i and 243q, a pair of registers 244i and 244q, and a pair of buffers 245i and 245q. Correlator 240a accepts the $I_S$ and $Q_S$ samples, and the sample clock $F_S$ and IORQ, from the channel bus 20 along with the instantaneous carrier phase bits $\pi_0, \pi_1 \ldots \pi_n$ from the synchronizer 220 and the PRN code signal from the delay line 250. Correlator 240b also receives an enable control line EN. Correlators 240a have this control line EN permanently enabled. The correlators 240 also receive correlator load pulses $CLD_x$ from the interrupt controller 166 via the control bus 18.

In operation, the correlator correlates the incoming samples $I_S$ and $Q_S$ with the locally generated PRN CODE reference signal, rotates the result by the instantaneous carrier phase angle estimate as represented by the bits $\pi_0, \pi_1 \ldots \pi_n$ and then accumulates the result in registers 244 using the adders 243. The contents of the registers 244 are forwarded to the buffers 245 and then to the processor 16 upon each $CLD_x$ pulse. The registers 244 are cleared to restart the next accumulation.

The decoding and rotation logic 242 performs the following arithmetic on its input signals:

$$I_D = I_S \cdot PRN \cdot \cos(\theta) + Q_S \cdot PRN \cdot \sin(\theta)$$

$$Q_D = Q_S \cdot PRN \cdot \cos(\theta) - I_S \cdot PRN \cdot \sin(\theta)$$

where PRN is the current value of the PRN CODE input and $\theta$ is the instantaneous carrier phase estimate represented by the bits $\pi_0, \pi_1 \ldots \pi_n$. By performing code correlation and removing the instantaneous Doppler shift in the same operation at every $F_S$ clock pulse, signals with very high Doppler offsets may be processed before any significant power loss is encountered.

The adders 243 and registers 244 perform a low frequency filtering function on the $I_D$ and $Q_D$ data, by simple accumulation of successive samples.

The synchronization of the receiver 10 can now be better understood by referring back to FIG. 4. In general, carrier and code drift is detected by determining the difference in the outputs of the correlators 240a and 240b. When a difference is detected, the synchronizer 220 is corrected by adjusting the internal values in its counters, 222, 224 or 226, or doppler register 221. For example, when the synchronizer 220 is exactly in phase, a correlator which is early by $\frac{1}{4}$ of a PRN code chip time will have the same output power as a correlator which is late by $\frac{1}{4}$ of a PRN code chip time. The sum of the squared values of the $I_A$ and $Q_A$ outputs provide an indication of the correlation power. The output power of a punctual correlator 240a and early correlator 240b will also differ by a predetermined amount, provided they are also spaced by a predetermined time delay.

Before synchronization is established, the operating mode switch 256 is set to the (Early, Late) mode, and a delay of $\frac{1}{2}$ a PRN code chip time is used between the early correlator 240b and late correlator 240a.

Next, the PRN code for the desired satellite is loaded into the PRN code generator 230 via the SEL lines. All possible frequencies and code phase delays are then successively tried in an attempt to obtain frequency and code lock with the satellite signal received from the assigned to channel 22n. In particular, the carrier delays are swept by trying different EDOPP values. Different code delays are swept by adjusting the code counters 224, 226a, and 226b via the buffers 227, 228, and 299. At each code and frequency offset, the correlator outputs $I_A$, $Q_A$, from correlator 240a and $I_B$, $Q_B$ from correlator 240b are ready and a correlator power level is calculated to determine whether the current code and frequency are correct. The correlator outputs are compared to predetermined thresholds to determine whether the satellite has been locked onto or not; If lock is not indicated, the next carrier and code phase are tried. The correlators 240a and 240b must be allowed to dwell for an appropriate time at each code and carrier delay. When searching for strong satellites, where the signal to noise ratio is above 45 dBHz, a dwell time of $\frac{1}{4}$ of a PRN code epoch is used. For weaker satellites, a dwell time approximately equal to the PRN code epoch time is used.

The common clock line CLDx to the correlators 240 is selected to be one of the INT1, INT4, or INT20 signals depending upon the mode of correlator 240. For example, during an initial fast seek mode, the INT4 signal may be used to provide a quick indication of the relative correlator powers. Once frequency lock and code synchronism has been established, the INT20 signal may be used to reduce the time devoted to this task. Fine adjustments to the phase may be continuously made by incrementing or decrementing the individual code phase registers 226 (FIG. 5).

Once the satellite is correctly locked onto frequency and code phase, correlator 240b is switched to the (Punctual, Early-Late) mode by moving the switch 256 to the exclusive-OR position. In this mode, the output of correlator 240b is used as required to maintain code lock. The delay between the early and late clocks E and L is also slowly decreased by adjusting the contents of the registers 226P and 226L (FIG. 5). By narrowing the delay, the noise level of the discrimination function performed by the Early-Late correlator 240b is decreased and its accuracy is increased.

Once the carrier and code have been locked, the data bits can be considered to be valid and can be demodulated by sampling the $I_A$ signal output from the punctual correlator 240a.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A receiver for decoding a composite signal consisting of a plurality of pseudorandom noise (PRN) encoded signals, the receiver comprising:

means for generating a local clock signal;

a sampling circuit, connected to receive the composite signal and the local clock signal, and to provide digital in-phase (I) and quadrature (Q) samples of the composite signal;

a channel circuit, for decoding one of the PRN encoded signals, wherein the channel circuit further comprises:

means for generating a Doppler shift estimate signal;

a correlator connected to receive the I and Q samples, a local carrier reference signal, and a local code reference signal, and to provide a code adjustment signal; and a code and carrier synchronizing circuit, connected to receive the sample clock signal, the Doppler shift estimate signal, and the code adjustment signal, for providing the carrier reference signal and the code reference signal, with the carrier reference signal and code reference signals in synchronism with each other.

2. A receiver as in claim 1 wherein the channel circuit additionally comprises:

means for determining the relative divergence between the carrier reference signal and the code reference signal.

3. A receiver for decoding a composite signal consisting of a plurality of pseudorandom noise (PRN) encoded signals, the receiver comprising:

means for generating a local clock signal;

a sampling circuit, connected to receive the composite signal and the local clock signal, and to provide digital in-phase (I) and quadrature (Q) samples of the composite signal;

a channel circuit, for decoding one of the PRN encoded signals, wherein the channel circuit further comprises:

means for providing a local PRN code signal;

a pair of correlators, each correlator connected to receive the I and Q samples and the local PRN code, and to provide a decoded signal, wherein the correlators are selectably configurable as early and late correlators in a first mode, and configurable as punctual and early minus late correlators in a second mode.

4. A receiver as in claim 3 wherein the correlators use an integration time less that the epoch time of the PRN encoded signal in the first mode.

5. A receiver for decoding a composite signal consisting of a plurality of pseudorandom noise (PRN) encoded signals, the receiver comprising:

means for generating a local clock signal;

a sampling circuit, connected to receive the composite signal and the local clock signal, and to provide digital in-phase (I) and quadrature (Q) samples of the composite signal; and a channel circuit, for decoding one of the PRN encoded signals, wherein the channel circuit further comprises:

means for providing a local PRN code signal; and a pair of correlators, each correlator connected to receive the I and Q samples and the local PRN code, and to provide a decoded signal, wherein the correlators have dynamically selectable delays.

6. A receiver for decoding a composite signal consisting of a plurality of pseudorandom noise (PRN) encoded signals, the receiver comprising:

means for generating a local clock signal;

a gain control circuit, connected to receive the composite signal and having a gain control input, and connted to provide a gain-controlled composite signal;

a sampling circuit, connected to receive the gain-controlled composite signal and the local clock signal, and to provide digital in-phase (I) and quadrature (Q) samples of the composite signal;

a plurality of counters, with a counter associated with a particular expected absolute value of the digital I and Q samples, and the counters arranged to increment each time an I or Q sample having the corresponding magnitude is output by the sampling circuit; and means for reading the values of the counters and adjusting the gain control input of the gain control circuit.

7. A receiver as in claim 6 additionally comprising:

means for reading the values of the counters and comparing their relative magnitudes to determine if continuous wave jamming signals are present in the composite signal; and means for adjusting the gain control input, if jamming signals are present, so that the peak positive and negative values input to the sampling circuit correspond to the lowest positive and negative output values.

8. A receiver as in claim 7 wherein the sampling circuit provides digital in-phase (I) and quadrature (Q) samples having values in the range of 0, $+/-1$, $+/-2$, and $+/-3$, and the means for adjusting the gain control input adjusts the peak positive and negative values to correspond to digital values 0 and $+/-1$.

9. A receiver for demodulating and decoding a composite radio frequency (RF) signal consisting of a plurality of transmitted pseudorandom noise (PRN) encoded signals comprising:

an RF downconverter, connected to receive the composite RF signal and to provide a composite intermediate frequency (IF) signal;

means for generating a local sample clock signal;

a sampling circuit, connected to receive the composite IF signal and the local sample clock signal, and to provide digital in-phase (I) samples and quadrature (Q) samples of the composite IF signal;

a plurality of channel circuits, each channel circuit for demodulating and decoding one of the transmitted PRN encoded signals, and connected in parallel with the other channel circuits, such that each channel circuit receives the I samples and Q samples at the same time as the other channel circuits, wherein each channel circuit further comprises:

means for providing an expected carrier phase signal;

a synchronizing circuit, connected to receive the sample clock signal, the expected carrier phase signal, and a synchronizing adjustment signal, and connected to provide an accumulated carrier phase signal and a PRN code phase control signal, the accumulated carrier phase signal and code phase signals being synchronous with each other;

a PRN code signal generator, connected to receive the PRN code phase control signal and to provide a local reference PRN code signal;

decoding and carrier rotation means, including means for simultaneously demodulating and decoding the I and Q sample signals, connected to receive the I samples, the Q samples, the local reference PRN code signal, and the accumulated carrier phase signal, the demodulating means for phase-rotating the I and Q samples by an amount indicated by the carrier phase signal, and the decoding means for multiplying the I and Q samples by the local reference PRN code signal, and providing decoded I and Q samples; and correlation means, connected to receive the decoded I and Q samples, for determining the correlation power level at first and second code phase delays, and for providing the synchronizing adjustment signal to the synchronizing circuit by comparing the correlation power levels at the first and second phase delays.

* * * * *